(12) United States Patent
Scerbak et al.

(10) Patent No.: US 11,796,778 B2
(45) Date of Patent: Oct. 24, 2023

(54) SMALL, HIGH POWER OPTICAL ISOLATOR

(71) Applicant: Electro-Optics Technology, Incorporated, Traverse City, MI (US)

(72) Inventors: David G. Scerbak, Traverse City, MI (US); Joseph R. Mambourg, Spring Lake, MI (US)

(73) Assignee: Electro-Optics Technology, Incorporated, Traverse City, MI (US)

( * ) Notice: Subject to any disclaimer, the term of this patent is extended or adjusted under 35 U.S.C. 154(b) by 0 days.

(21) Appl. No.: 17/866,271

(22) Filed: Jul. 15, 2022

(65) Prior Publication Data

US 2022/0357563 A1 Nov. 10, 2022

Related U.S. Application Data

(63) Continuation of application No. 16/723,191, filed on Dec. 20, 2019, now Pat. No. 11,428,914.

(Continued)

(51) Int. Cl.
*G02B 17/00* (2006.01)
*G02B 27/28* (2006.01)
*G02F 1/09* (2006.01)

(52) U.S. Cl.
CPC ......... *G02B 17/006* (2013.01); *G02B 27/283* (2013.01); *G02B 27/286* (2013.01); *G02F 1/09* (2013.01)

(58) Field of Classification Search
CPC .. G02B 17/006; G02B 27/283; G02B 27/286; G02F 1/09

(Continued)

(56) References Cited

U.S. PATENT DOCUMENTS

| 5,115,340 A | 5/1992 | Tidwell |
| 6,126,775 A | 10/2000 | Cullen et al. |

(Continued)

FOREIGN PATENT DOCUMENTS

| DE | 102010028213 A1 | 10/2011 |
| WO | WO-2011066983 A2 | 6/2011 |

OTHER PUBLICATIONS

Khazanov, "Faraday isolators for high average power lasers" Institute of Applied Physics of the Russian Academy of Science, 1-72, Feb. 1, 2010.

(Continued)

*Primary Examiner* — Collin X Beatty
*Assistant Examiner* — Grant A Gagnon
(74) *Attorney, Agent, or Firm* — Morrison & Foerster LLP

(57) ABSTRACT

An optical isolator for use with high power, collimated laser radiation includes an input polarizing optical element, at least one Faraday optical element, at least two reflective optical elements for reflecting laser radiation to provide an even number of passes through said at least one Faraday optical element, at least one reciprocal polarization altering optical element, an output polarizing optical element, at least one light redirecting element for remotely dissipating isolated or lost laser radiation. The isolator also includes at least one magnetic structure capable of generating a uniform magnetic field within the Faraday optical element which is aligned to the path of the collimated laser radiation and a mechanical structure for holding said optical elements to provide thermal gradients that are aligned to the path of the collimated laser radiation and that provide thermal and mechanical isolation between the magnetic structure and the optical elements.

20 Claims, 13 Drawing Sheets

Related U.S. Application Data

(60) Provisional application No. 62/782,494, filed on Dec. 20, 2018.

(58) Field of Classification Search
USPC .......................................................... 359/281
See application file for complete search history.

(56) References Cited

U.S. PATENT DOCUMENTS

| | | |
|---|---|---|
| 6,447,459 B1 | 9/2002 | Larom |
| 6,487,014 B2 | 11/2002 | Li |
| 7,057,791 B2 | 6/2006 | Azimi et al. |
| 7,282,032 B2 | 10/2007 | Miller |
| 7,306,376 B2 | 12/2007 | Scerbak et al. |
| 7,426,325 B2 | 9/2008 | Scerbak et al. |
| 7,715,664 B1 | 5/2010 | Shou et al. |
| 8,547,636 B1 | 10/2013 | Niessink |
| 8,565,561 B2 | 10/2013 | Lida |
| 8,773,323 B1 | 7/2014 | Manry et al. |
| 9,130,334 B2 | 9/2015 | Durkin et al. |
| 9,268,159 B2 | 2/2016 | Rogers et al. |
| 9,304,337 B2 | 4/2016 | Ebenwalder et al. |
| 9,482,888 B2 | 11/2016 | Makikawa et al. |
| 9,557,586 B2 | 1/2017 | Hosokawa |
| 9,617,470 B2 | 4/2017 | Shimamura et al. |
| 9,869,890 B2 | 1/2018 | Nakamura et al. |
| 9,885,890 B2 | 2/2018 | Nakamura et al. |
| 10,120,213 B2 | 11/2018 | Diedrich et al. |
| 2013/0314784 A1 | 11/2013 | Fattal et al. |
| 2014/0218795 A1 | 8/2014 | Scerbak |
| 2017/0176781 A1 | 6/2017 | Scerbak et al. |
| 2018/0356656 A1 | 12/2018 | Watanabe |
| 2019/0018265 A1 | 1/2019 | Kolis et al. |
| 2019/0309440 A1 | 10/2019 | Watanabe |
| 2019/0346707 A1 | 11/2019 | Scerbak et al. |

OTHER PUBLICATIONS

Notice of Allowance received for U.S. Appl. No. 16/723,191 dated Apr. 19, 2022, 9 pages.

Office Action received for U.S. Appl. No. 16/723,191 dated Sep. 15, 2021, 11 pages.

Snetkov, "Faraday isolator based on a TSAG single crystal with compensation of thermally induced depolarization inside magnetic field" Optics Materials 293-297, Feb. 11, 2015.

Starobor et al., "Faraday Isolator for High-power nonpolarized radiation" Optics Communications, 103-106, May 19, 2015.

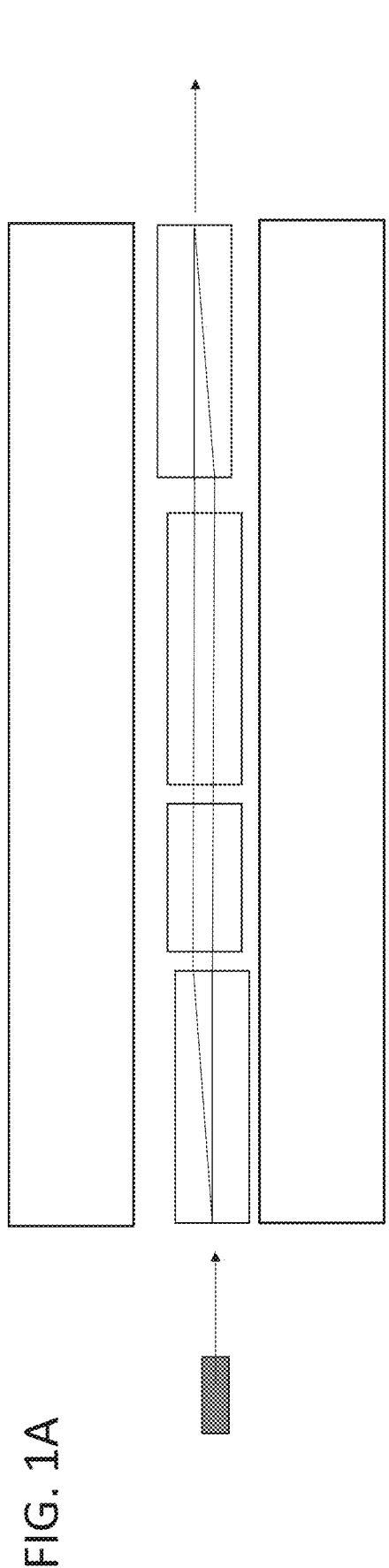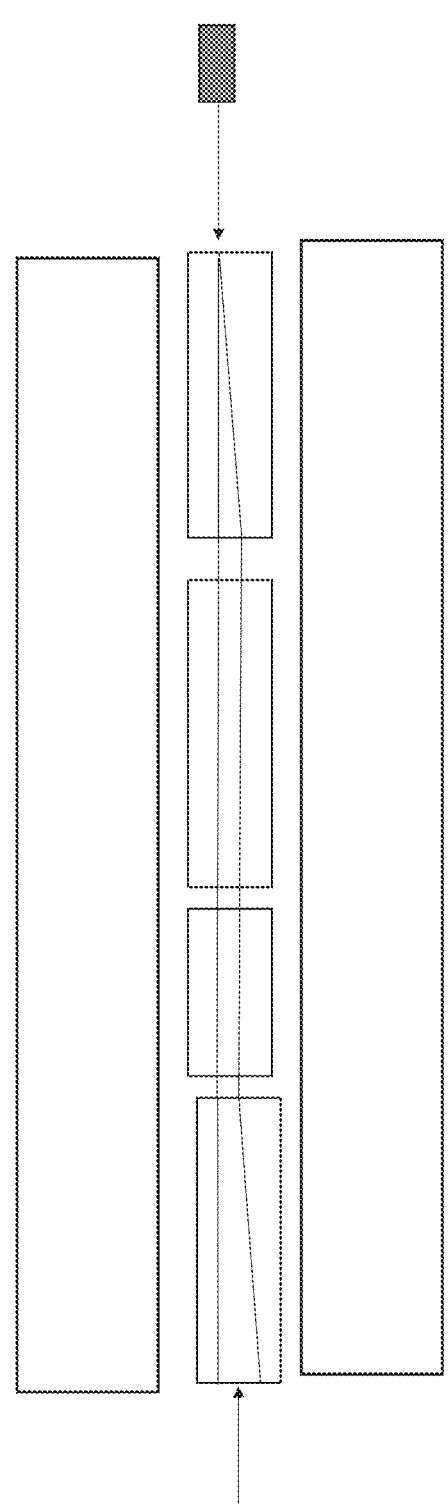

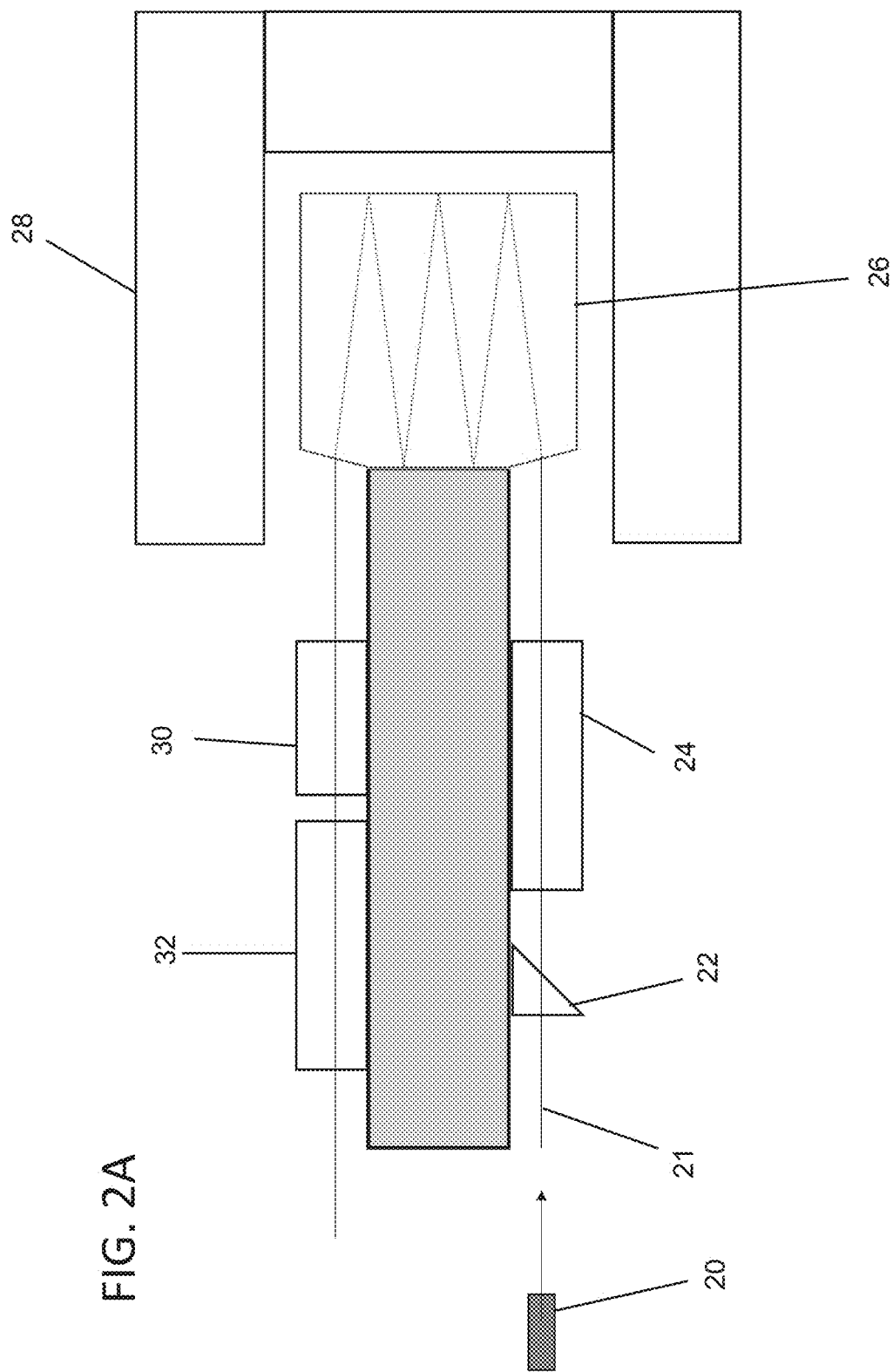

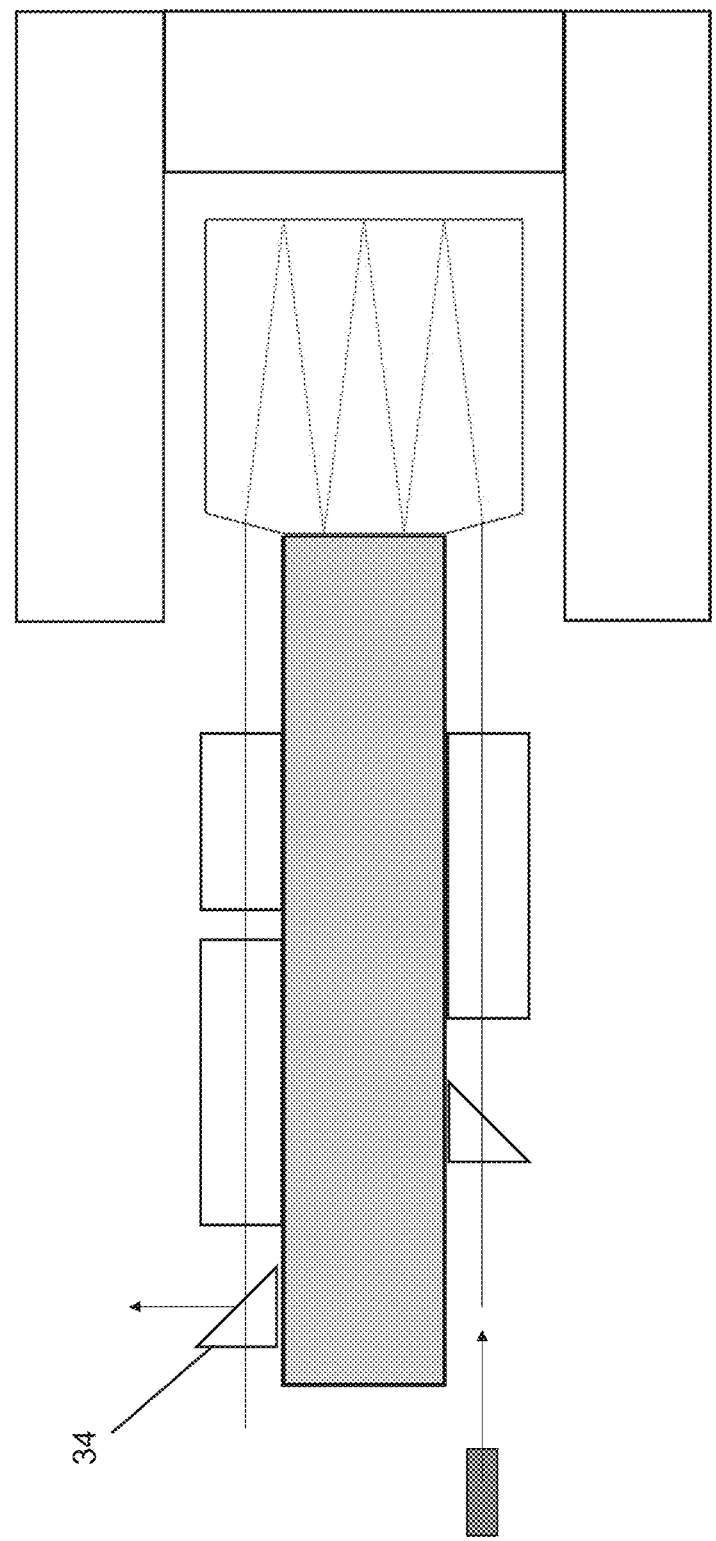

SMALL, HIGH POWER OPTICAL ISOLATOR

CROSS REFERENCE TO RELATED APPLICATION

The present application is a continuation of U.S. patent Ser. No. 16/723,191, filed Dec. 20, 2019 which in turn claims the filing benefits of U.S. provisional application Ser. No. 62/782,494, filed Dec. 20, 2018, both of which are incorporated herein by reference in their entirety.

FIELD OF THE INVENTION

The present invention relates to small, high power polarization insensitive and polarization maintaining optical isolators.

BACKGROUND OF THE INVENTION

Polarization insensitive and polarization maintaining optical isolators are routinely used to decouple amplifiers within laser systems and to limit returning radiation from downstream components. Polarization insensitive optical isolators are typically comprised of Faraday and quartz rotator optical elements surrounded by two birefringent crystal displacers and a magnetic structure capable of producing a uniform magnetic field and Faraday rotation within the Faraday optic. FIGS. 1A and 1B demonstrate a typical fiber to fiber polarization insensitive isolator. As shown in FIG. 1A, forward going light is separated into an extraordinary and ordinary polarized beam by the input displacer. These beam polarizations are then rotated 45° clockwise by the Faraday optic and an additional 45° clockwise by the quartz rotator so that the extraordinary beam passes the output displacer without deviation while the ordinary beam is displaced vertically to meet it. In the reverse going direction, as shown in FIG. 1B, the output displacer separates the light into an ordinary and extraordinary polarized beam. These beam polarizations are then rotated 45° counter clockwise by the quartz rotator and 45° clockwise by the Faraday optic so that the ordinary beam passes the input displacer without deviation while the extraordinary beam is displaced further. This results in about 50% of the reverse going light being directed above and about 50% below the primary forward going beam for randomly polarized reverse going laser radiation. This light is typically absorbed by an internal aperture component to ensure isolation of the light.

Polarization maintaining optical isolators typically replace the input and output birefringent displacers with polarizing beam splitter (PBS) cubes that are oriented such that their transmission planes are typically 0°, 45° or 90° apart (rotated to account for 45° Faraday rotation and any quartz rotator or half waveplate rotation desired which is typically ≈+/−45°). In this configuration, a forward propagating, linearly polarized beam passes the input PBS cube and its polarization is rotated 45° clockwise by the Faraday optic and, for example, an additional 45° clockwise by the quartz rotator. The beam is thus rotated to be aligned with the output PBS cube and passes uninhibited. In the reverse going direction, the polarized beam passes the output PBS cube and its polarization is rotated 45° counterclockwise by the quartz rotator and 45° clockwise by the Faraday optic. After passage through the Faraday optic, the beam is aligned to the extinction plane of the input PBS cube and is therefore reflected by the hypotenuse away from the forward propagating beam and absorbed by an internal component.

Although these optical layouts have been used in fiber lasers for many years at powers below 20 W, current state of the art fiber laser systems require operation above 40 W in an ever-decreasing package size. If the classic isolator layout as described is applied; many limitations become clear. To begin, the classic layout is physically very large. Assuming minimum spacing between optics and typical fiber collimator spacing, the isolator is at least 75 mm long. In addition, the surrounding magnet structure that is required to achieve Faraday rotation is inefficiently large due to the layout's requirement to achieve high fields over a long Faraday optic. Furthermore, it is impossible to mount the Faraday optic within the classic layout in such a manner that significantly reduce its internal thermal gradients. These thermal gradients cause both pointing shifts of the outgoing beam as well as a reduction in beam quality. These effects are only exaggerated in high reverse power conditions where absorption of reverse going power causes additional heating and potential catastrophic thermal failures.

What is needed is a high-power optical isolator which enables small size and limited power dependent effects.

SUMMARY OF THE INVENTION

The present invention provides a high-power optical isolator which enables small size and limited power dependent effects. According to an aspect of the present invention, an optical isolator for use with high power, collimated laser radiation enabling small size and limited power dependent instability, includes an input polarizing optical element, at least one Faraday optical element, at least two reflective optical elements for reflecting laser radiation to provide an even number of passes through the at least one Faraday optical element, at least one reciprocal polarization altering optical element, an output polarizing optical element, at least one light redirecting element for remotely dissipating isolated or lost laser radiation, and at least one magnetic structure capable of generating a uniform magnetic field within the Faraday optical element, which is generally aligned to the path of the collimated laser radiation. A mechanical structure holds the optical elements to provide thermal gradients that are generally aligned to the path of the collimated laser radiation and that provide thermal and mechanical isolation between the magnetic structure and the optical elements.

These and other objects, advantages, purposes and features of the present invention will become apparent upon review of the following specification in conjunction with the drawings.

BRIEF DESCRIPTION OF THE DRAWINGS

FIG. 1A is a schematic showing a forward going operation of traditional polarization insensitive isolator;

FIG. 1B is a schematic showing a reverse going operation of traditional polarization insensitive isolator;

FIG. 2A is a schematic showing a forward going operation of a preferred embodiment of the polarization insensitive configuration of the present invention;

FIG. 3 is a schematic showing a forward going operation of an embodiment of the present invention using an output rejection mirror;

DETAILED DESCRIPTION OF THE PREFERRED EMBODIMENTS

Figure 2B:
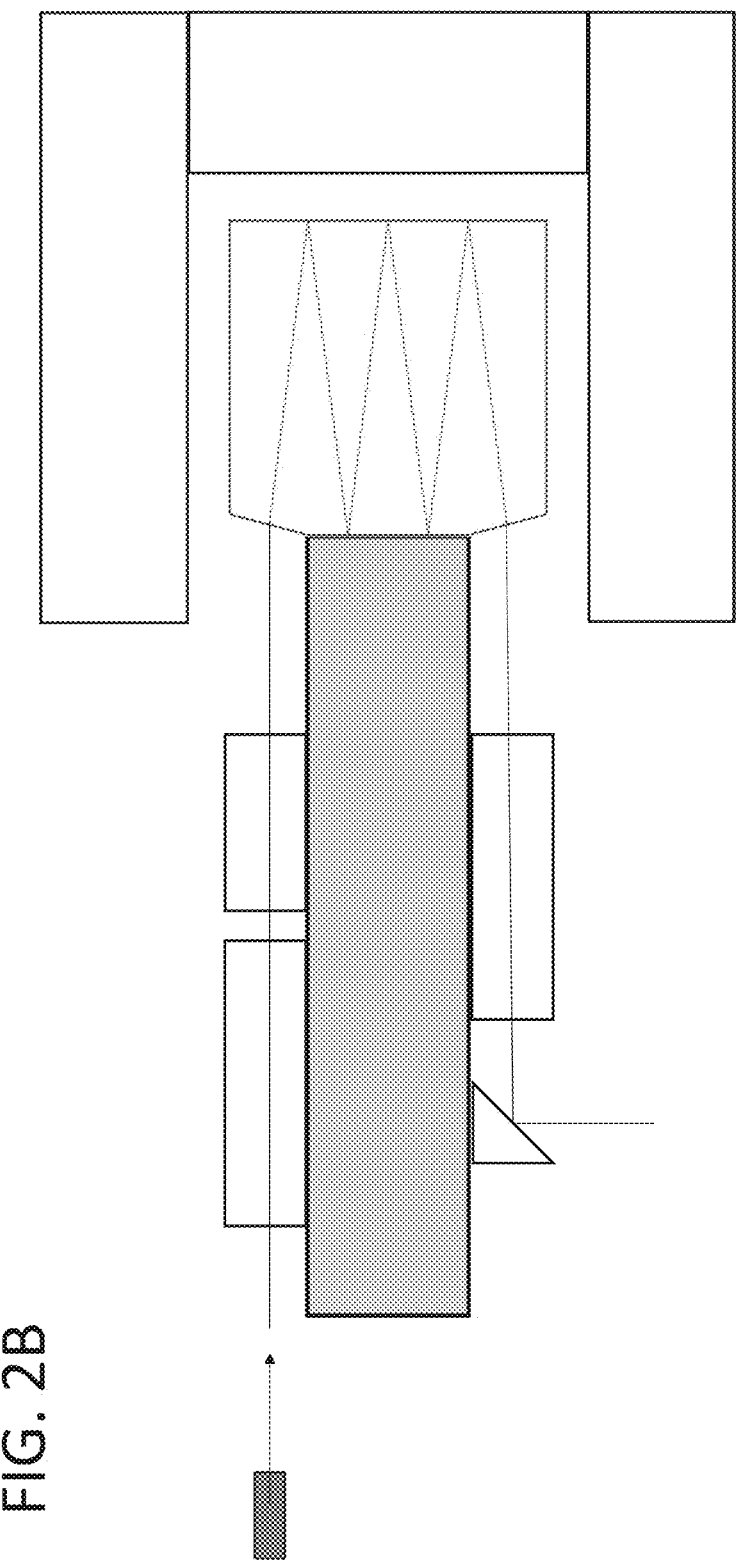
FIG. 2B is a schematic showing a reverse going operation of a preferred embodiment of the polarization insensitive configuration of the present invention.

The present invention provides a high-power optical isolator which enables small size and limited power dependent effects. In a preferred embodiment of the present invention, and as shown in FIG. 2A, a generally collimated beam of laser radiation 21 (emitted by a laser source 20) is directed at the input face of an input displacer 24 via the inner aperture of a rejection mirror 22. This beam is separated into an extraordinary and ordinary polarized beam by the input displacer. These beam polarizations are then rotated 45° clockwise by passage through an irregular hexagon shaped Faraday optic 26 housed within a magnetic structure 28, and then rotated by an additional 45° clockwise by a reciprocal optical rotator 30. The beams are then recombined by an output displacer 32 to form a single output beam of laser radiation.

With light traveling in the reverse going direction (FIG. 2B), a generally collimated beam of laser radiation is directed at the output face of the output displacer which separates the beam into an ordinary and extraordinary polarized beam of laser radiation. The beam polarizations are rotated 45° counter clockwise by the reciprocal optical rotator and then 45° clockwise by passage through an irregular hexagon shaped Faraday optic. The extraordinary beam is then displaced again by the input displacer while the ordinary beam continues on its path. This results in the ordinary beam being displaced below and the extraordinary beam being displaced above the forward going generally collimated beam of laser radiation. The ordinary and extraordinary beams are then reflected off of the rejection mirror away from the forward going generally collimated beam of laser radiation, thereby isolating the reverse going power. In addition to isolating the reverse going power from the forward going power, the rejection mirror allows for the power to be remotely dissipated which eliminates heating within the isolator.

In this preferred embodiment of the present invention, the input displacer, output displacer, reciprocal optical rotator, and irregular hexagon shaped Faraday optic are all mounted to the single piece optic holder. In addition, the irregular hexagon shaped Faraday optic has at least two surfaces which are coated with a high reflection coating to ensure proper passage of the beams through the isolator. Furthermore, the irregular hexagon shaped Faraday optic is mounted to the single piece optic holder onto at least one of the high reflection coated surfaces to ensure thermal gradients that are well aligned to the generally collimated beams. Finally, the magnetic structure surrounding the irregular hexagon shaped Faraday optic is thermally and mechanically isolated from each other by, for example, the use of a small air gap.

In an additional embodiment of the present invention, an output rejection mirror 34 may be added to the system as shown in FIG. 3. The forward going light passes through the center aperture of an output rejection mirror after recombination within the output displacer. This is beneficial in high power situations where heating within the irregular hexagon shaped Faraday optic causes the polarization rotation within the Faraday optic to be not 45°. In this condition, the extraordinary and ordinary polarized beams do not properly recombine within the output displacer and, instead, form additional beams above and below the primary forward going beam. These beams will be rejected by the output rejection mirror so that they can be properly dissipated remotely; thereby limiting additional isolator heating and failures.

Figure 4:
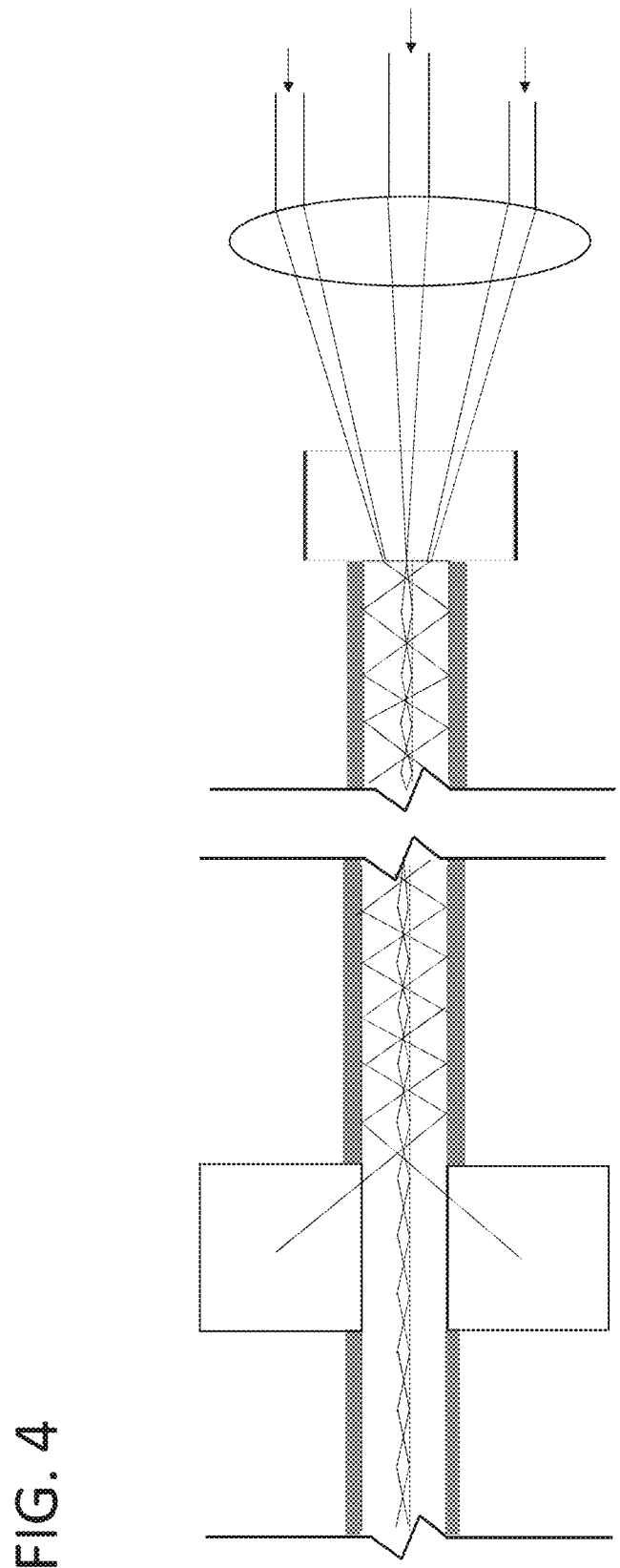
FIG. 4 is a schematic showing a coupling of isolated power into fiber optic with dual cladding for remote dissipation of the isolated or lost laser radiation in a cladding mode stripping splice.
Figure 5:
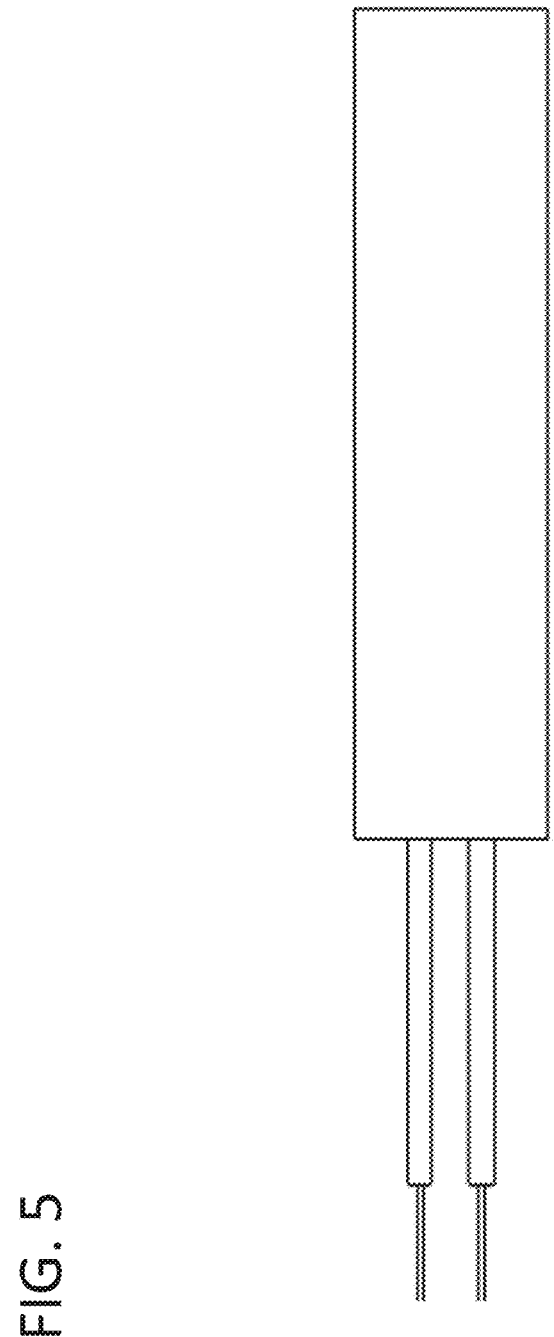
FIG. 5 is a schematic showing a top view of a practical application of the present invention.
Figure 6:
FIG. 6 is a side view of the practical application of FIG. 5.
Figure 7:
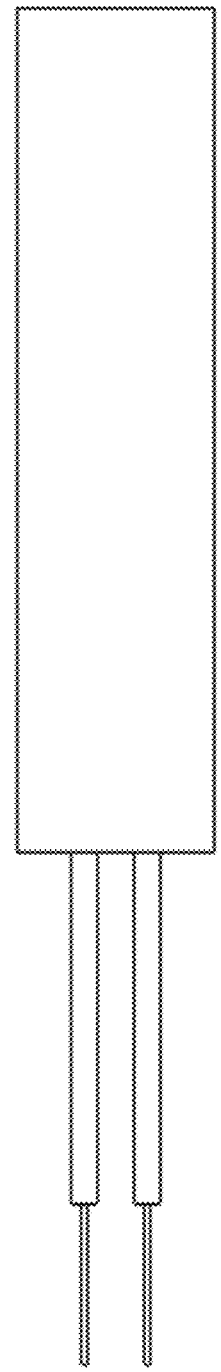
FIG. 7 is a bottom view of the practical application of FIG. 5.
Figure 9:
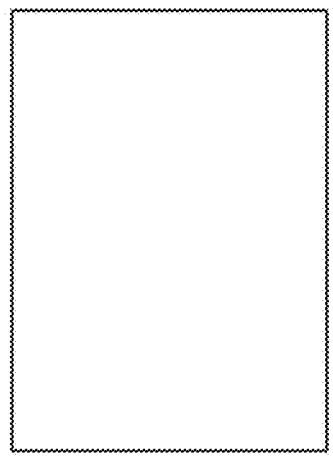
FIG. 9 is an opposite end view of the practical application of FIG. 8.
Figure 8:
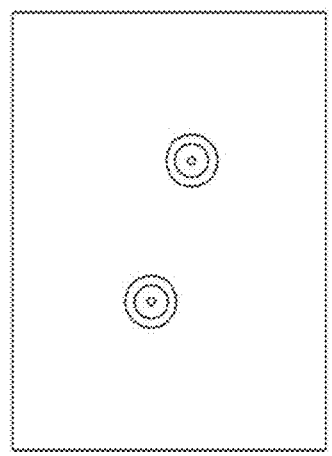
FIG. 8 is an end view of the practical application of FIG. 5.

In an additional embodiment of the present invention, in fiber coupled applications where the light is being launched from an input fiber and recoupled into an outgoing fiber, the fiber collimating lenses can be designed such that the offset beams would be focused into the cladding of the dual clad fibers as shown in FIG. 4. This light would then be dissipated remotely at the cladding mode stripper which are typically placed throughout the fiber laser systems. This provides for an even smaller package size while limiting high power heating of the isolator.

In an additional embodiment of the present invention, in polarization maintaining applications where polarized laser radiation is being directed at the optical isolator, the input rejection mirror and input displacer can be replaced with an input PBS cube and the output displacer and optional output rejection mirror can be replaced by an output PBS cube. This allows for a further decrease in isolator size while maintaining the high-power performance that is enabled by the present invention (FIGS. 5-9).

Figure 10:
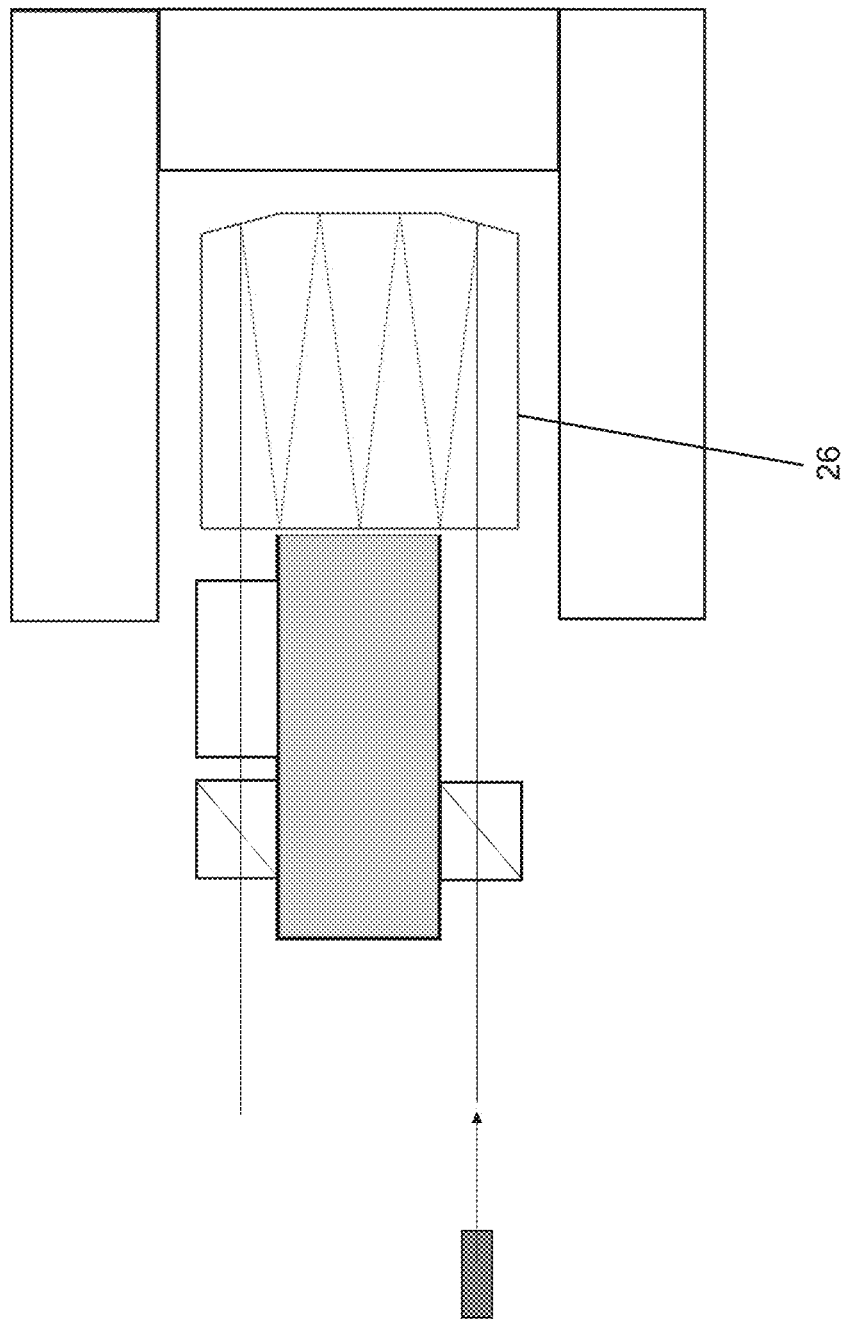
FIG. 10 is a schematic showing a forward going operation of a preferred embodiment of the polarization maintaining configuration of the present invention showing alternate embodiment of irregular hexagon Faraday optic.
Figure 11:
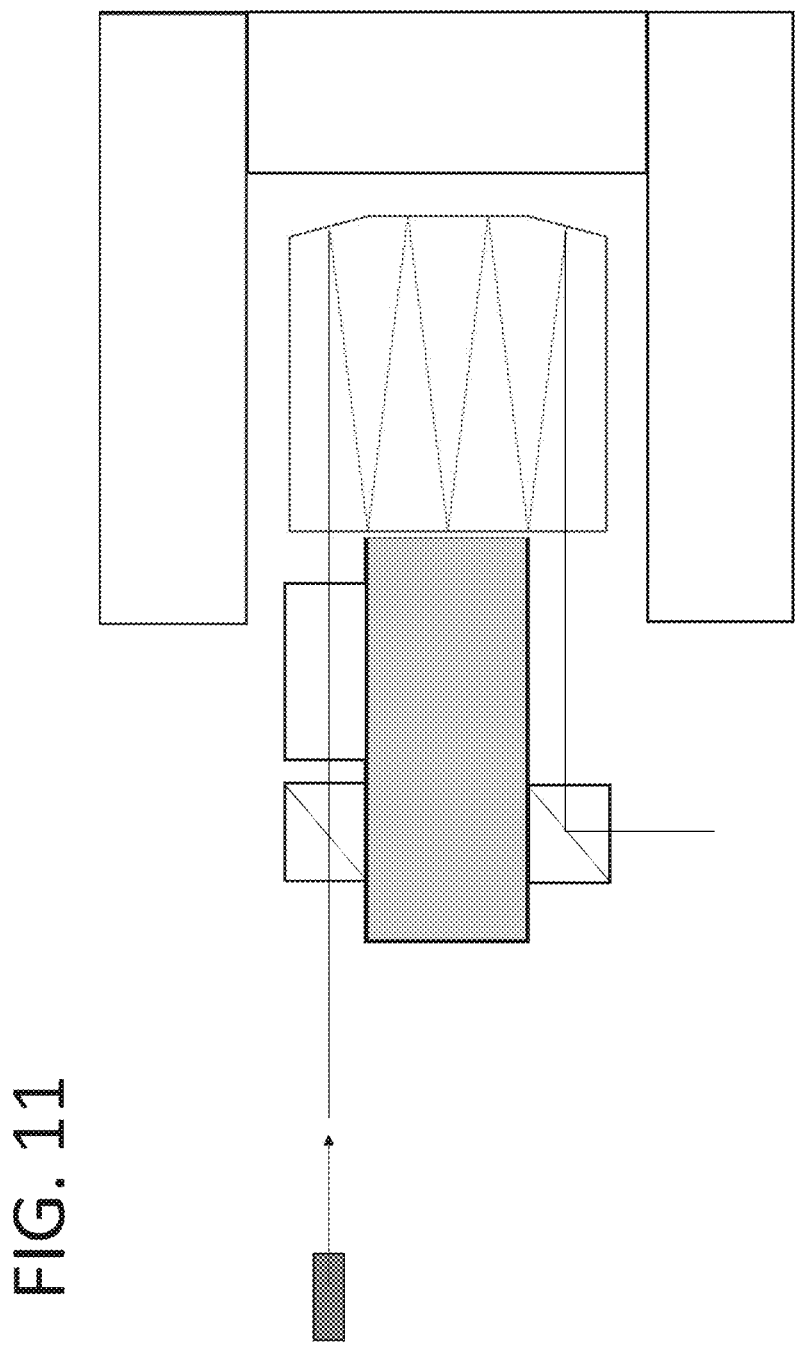
FIG. 11 is a schematic showing a reverse going operation of a preferred embodiment of the polarization maintaining configuration of the present invention showing alternate embodiment of irregular hexagon Faraday optic.

In an additional embodiment of the present invention, in broadband applications where dispersion within the irregular hexagon shaped Faraday optic would cause a reduction in performance, the irregular hexagon shaped Faraday optic 26 may be configured as shown in FIGS. 10 and 11, for example. In this alternate configuration, the first surface of a terbium gallium garnet (TGG) or a potassium terbium fluoride (KTF) 26 is broken into three regions. Where the outer regions are optically coated with an anti-reflection coating and the center region is coated with a high reflection coating. The three opposing surfaces are coated with high reflection coatings. This directs the forward and reverse going laser radiation to pass through the Faraday optic 26 in a manner that would not induce deleterious dispersion related effects while still enabling small size and high power performance.

Figure 12:
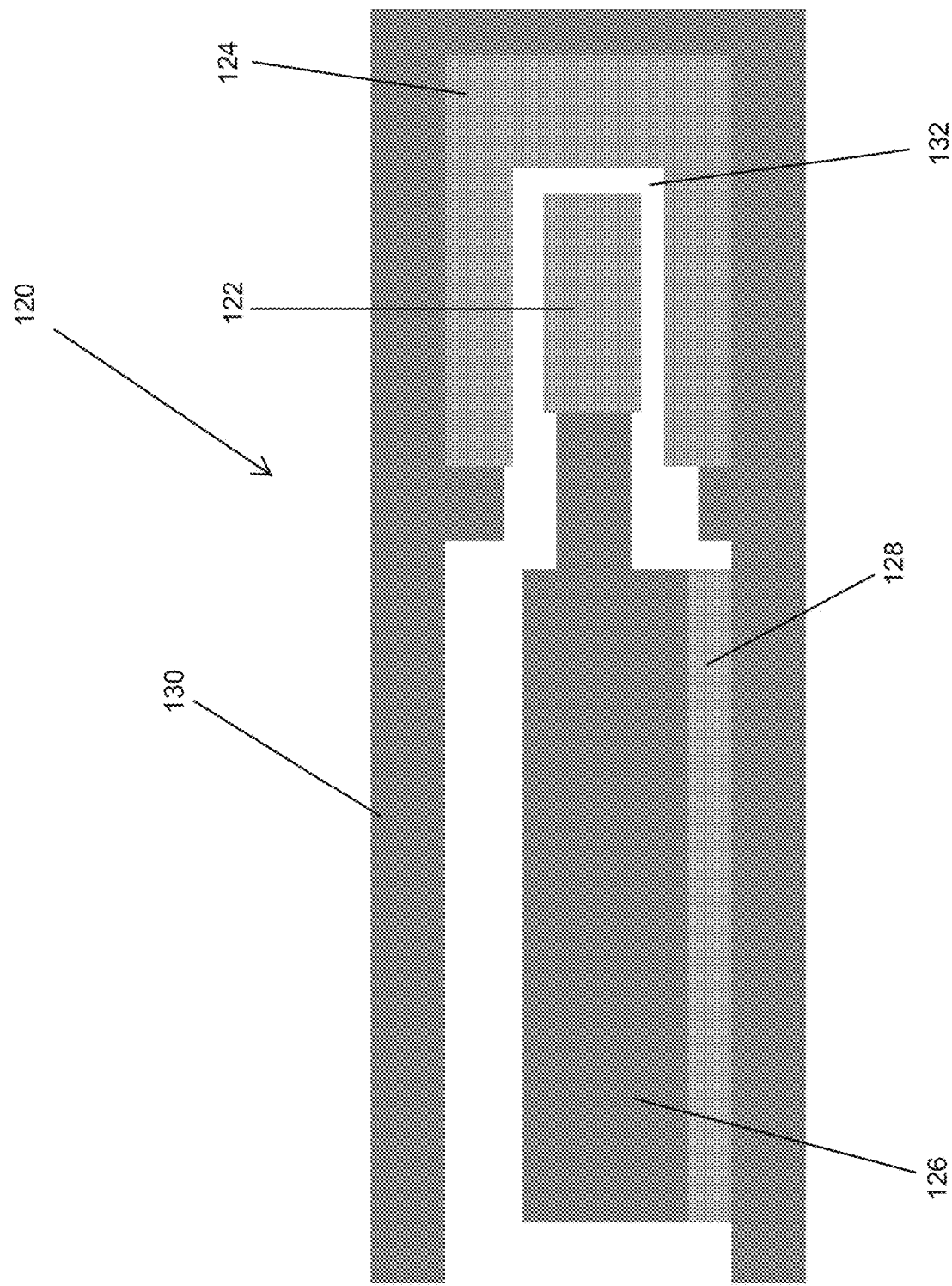
FIG. 12 is a sectional view of an optical isolator in accordance with the present invention.

Referring to FIG. 12, in some aspects, a high-power optical isolator 120 includes a mechanical structure (i.e., an outer housing) 130. The outer housing 130 includes an optical holder 126 that contains the displacers, rotators, etc.

for directing the beam path. A Faraday optic 122 (e.g., an irregular hexagon shaped Faraday optic such as TGG or KTF) is mounted to an end of the optical holder. The Faraday optic is surrounded by a magnetic structure 124. The optical holder 126 is coupled to the outer housing 130 via a pliable layer 128 that mechanically isolates the inner optical holder 126 from the outer housing 130. The pliable layer 128 may include an adhesive to bond the optical holder 126 in place. The pliable layer 128 may compress and decompress in response to both internal forces (e.g., forces generated by the magnetic structure 124) and external forces (e.g., forces applied to the outer housing 130 via an external source), thus mechanically isolating the optical holder 126 (and similarly the Faraday optic 122) from the outer housing 130. In some aspects, the pliable layer 128 is thermally conductive or thermally isolating in order to thermally isolate the optical holder 126 from the outer housing 130. Optionally, a heatsink may be mounted to the outer housing 130 to dissipate any heat absorbed by the isolator 120. An air gap 132 that surrounds the Faraday optic 122 and separates the Faraday optic 122 from the magnetic structure 124 (and the outer housing 130) may provide further thermal and mechanical isolation for the Faraday optic 122.

Figure 13:
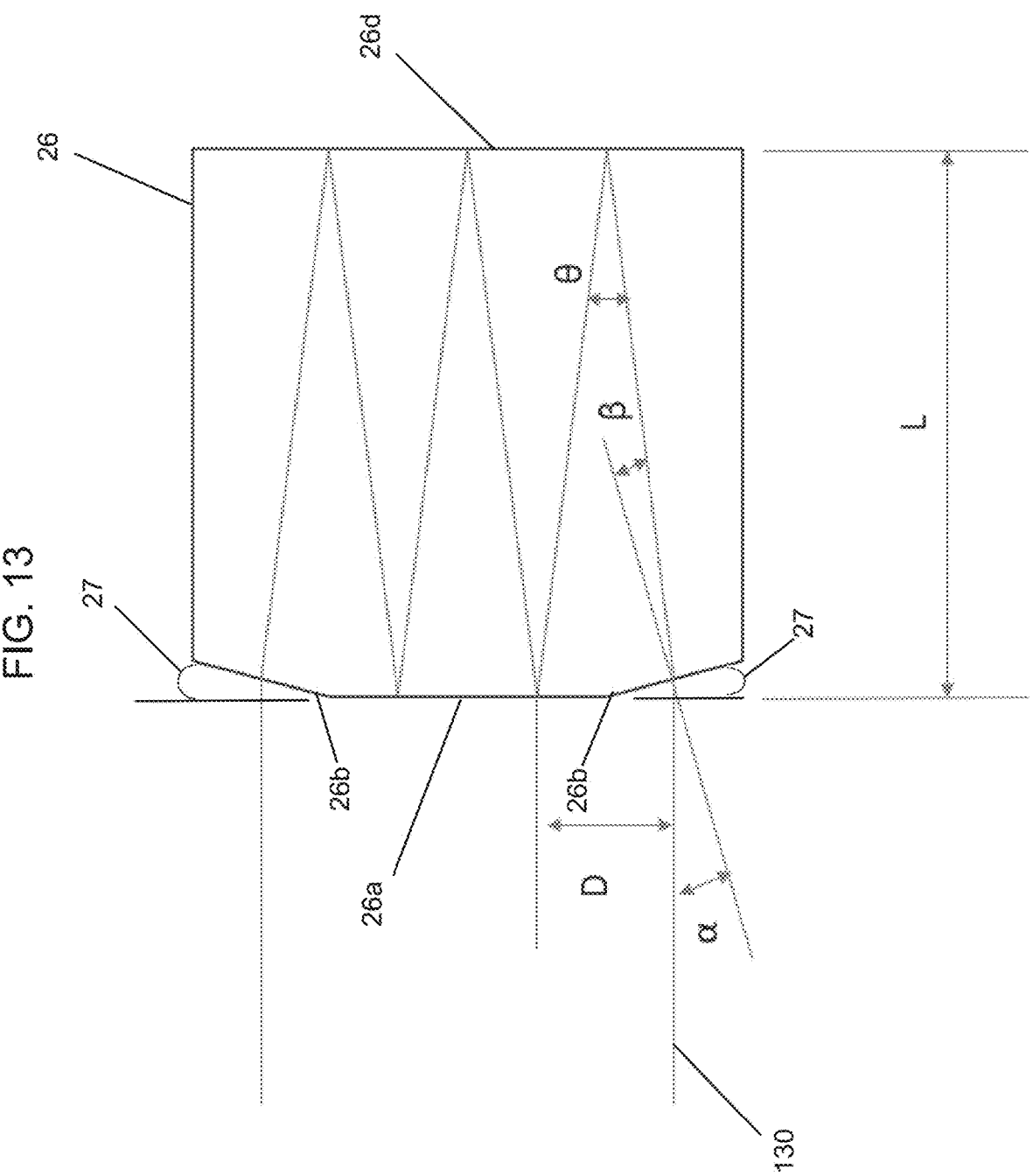
FIG. 13 is a plan view of a Faraday optic in accordance with the present invention.

Referring now to FIG. 13, the Faraday optic 26 may be an irregular hexagon shape with a front surface 26*a* that is parallel to an opposite surface 26*d* of the Faraday optic 26. The Faraday optic 26 may be mounted such that the beam of laser radiation enters the Faraday optic 26 perpendicular to the front surface 26*a*. The irregular hexagon shaped Faraday optic 26 may also include two or more front angled surfaces 26*b* that are angled relative to the front surface 26*a* by angle 27. That is, each angled surface 26*b* may have the same angle 26 relative to the front surface 26*a*. The angle is greater than 2 degrees. Beams of laser radiation that enter the Faraday optic 26 at the front angled surface 26*b* may have an external angle of incidence $\alpha$ and an internal angle of incidence $\beta$. Beams of laser radiation may enter the Faraday optic 26 and reflect off of the opposite surface 26*d* with a reflection angle $\theta$. The Faraday optic 26 may have a length L that corresponds to a distance between the front surface 26*a* and the opposite surface 26*d*. When the index of refraction of air is represented by $n_1$ and the index of refraction of the Faraday optic 26 is represented by $n_2$, the external angle of incidence $\alpha$, the external angle of incidence $\beta$, and the reflection angle $\theta$ have a relationship as shown in Equations (1) and (2).

$$n_1 \sin \alpha = n_2 \sin \beta \quad (1)$$

$$\theta = 2(\alpha - \beta) \quad (2)$$

The length L of the Faraday optic 26 and an approximately three times the diameter of the beam of laser radiation D (i.e., D≅3*beam diameter) have a relationship as shown in Equation (3).

$$\tan(0.5\theta) = \frac{0.5D}{L} \quad (3)$$

Thus, when taking into account the appropriate refractive indexes, an appropriate length L of the Faraday optic may be selected for a given beam diameter. For example, for a 0.5 millimeter diameter beam (i.e., D is 1.5) the Faraday optical may have a length L of 8 mm, $\theta$ may be 10.71 degrees, $\alpha$ may be 10.91 degrees, and $\beta$ may be 5.56 degrees.

The irregular hexagon shaped Faraday optic 26, when mounted to the optical holder 126 by front surface 26*a* (or, in some examples, by the opposite surface 26*d* (FIGS. 10 and 11)), thermally aligns temperature gradients through the Faraday optic 26. Thus, beams that pass through the Faraday optic on the same plane experience the same temperature gradients. This ensures that the thermal gradients do not cause beam pointing (i.e., drifting of the beam position from the ideal position). That is, aligning the temperature gradients increases beam point stability.

The present invention is thus an improvement over the prior art and provides for a high-power polarization insensitive and polarization maintaining optical isolator enabling small size and limited power dependent effects. In contrast to the prior art, the irregular hexagon shaped Faraday optic with at least two high reflection coatings allow the input displacer, output displacer, and reciprocal rotator to be placed adjacent to each other, thereby reducing the isolators overall length. In addition, by mounting the irregular hexagon shaped Faraday optic such that any absorbed power which heats the Faraday optic will produce thermal gradients well aligned to the generally collimated beams ensures limited power dependent thermal pointing shifts. The additional benefit of this mounting configuration is that a long optical pathlength within the Faraday optic is not deleterious to the isolator's performance. This permits the use of a long optical pathlength within the Faraday optic while enabling a highly efficient and minimal volume of magnets to produce 45° of Faraday rotation. Furthermore, by thermally isolating the magnet structure from the optic structure, the absorbed power within the optics only heats the optic structure and not the magnets; thereby reducing the power dependent transmission loss due to heating by as much as 25%. Finally, by remotely dissipating the isolated reverse going power and lost forward going power the present invention eliminates heating of the isolator which would cause significant power dependent effects.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. An optical isolator, comprising:
    a Faraday optic having opposite-facing front and back sides, the back side having a planar surface, the front side having:
        a first planar surface parallel with the planar surface of the back side, and
        second and third planar surfaces arranged such that the first planar surface is between the second and third planar surfaces, each of the second and third planar surfaces being angled away from the first planar surface at an oblique angle relative to the first planar surface; and
    high-reflection coatings on the planar surface of the back side and the first planar surface of the front side to provide an even number of passes between the front and back sides of forward-going laser radiation that is incident on the Faraday optic at the second planar surface at an initial propagation direction, the oblique angles of the second and third planar surfaces of the front side causing the forward-going laser radiation to leave the Faraday optic through the third planar surface at a subsequent propagation direction that is opposite and offset from the initial propagation direction.

2. The optical isolator of claim 1, wherein the oblique angle is greater than two degrees.

3. The optical isolator of claim 1, further comprising:
an input polarizing optical element configured to separate two orthogonally polarized components of collimated laser radiation and forward at least one of the two orthogonally polarized components along the initial propagation direction to the second planar surface of the front side of the Faraday optic as the forward-going laser radiation; and
an output polarizing optical element arranged to intercept the forward-going laser radiation when propagating away from the third planar surface of the front side of the Faraday optic after the even number of passes;
a reciprocal polarization altering optical element arranged to intercept the forward-going laser radiation between the input and output polarizing optical elements; and
a light redirecting element arranged to remotely dissipate isolated reverse-going laser radiation.

4. The optical isolator of claim 3, further comprising a magnetic structure for generating a magnetic field within the Faraday optic, the magnetic structure surrounding but being separated from the Faraday optic.

5. The optical isolator of claim 4, wherein
the Faraday optic and the magnetic structure are configured to rotate polarization of forward-going laser radiation by a total of 45 degrees in a first rotation direction; and
the reciprocal polarization altering optical element is configured to rotate polarization of the forward-going laser radiation by an additional 45 degrees in the first rotation direction.

6. The optical isolator of claim 3, wherein:
the input polarizing optical element is a first birefringent displacer configured to forward both of the two orthogonally polarized components as the forward-going laser radiation; and
the output polarizing optical element is a second birefringent displacer configured to combine the two orthogonally polarized components into a single output beam.

7. The optical isolator of claim 6, wherein the light redirecting element is a rejection mirror disposed in an input propagation path of the collimated laser radiation toward the first birefringent displacer, the rejection mirror being arranged to deflect reverse-going laser radiation displaced from the input propagation path.

8. The optical isolator of claim 6, further comprising a rejection mirror disposed in an output propagation path of the single output beam, the rejection mirror being arranged to deflect forward-going laser radiation not combined by the second birefringent displacer.

9. The optical isolator of claim 6, further comprising:
an optical fiber for receiving and transmitting the single output beam; and
a lens for coupling the single output beam into the optical fiber and directing, into a cladding of the optical fiber, forward-going laser radiation not combined by the output polarizing optical element.

10. The optical isolator of claim 3, wherein:
the input polarizing optical element is a first polarizing beam splitter cube configured to transmit only a selected one of the two orthogonally polarized components to the Faraday optic; and
the output polarizing optical element is a second polarizing beam splitter cube.

11. The optical isolator of claim 3, wherein the reciprocal polarization altering optical element is a half-wave plate.

12. The optical isolator of claim 1, wherein the optical isolator is configured for fiber coupling to an input fiber and an outgoing fiber.

13. The optical isolator of claim 1, wherein the Faraday optic includes potassium terbium fluoride.

14. An optical isolator, comprising:
a Faraday optic having opposite-facing front and back sides, the front side having a planar surface including first and second outer regions and a center region disposed between the first and second outer regions, the back side having:
a first planar surface parallel with the planar surface of the front side, and
second and third planar surfaces arranged such that the first planar surface is between the second and third planar surfaces, each of the second and third planar surfaces being angled away from the first planar surface at an oblique angle relative to the first planar surface; and
high-reflection coatings on the center region of the planar surface of the front side and the first, second, and third planar surface of the back side to provide an even number of passes between the front and back sides of forward-going laser radiation that is incident on the front side of the Faraday optic at the first outer region at an initial propagation direction, the oblique angles of the first and second planar surfaces of the back side causing the forward-going laser radiation to leave the Faraday optic through the second outer region of the planar surface of the front side at a subsequent propagation direction that is opposite and offset from the initial propagation direction.

15. The optical isolator of claim 14, further comprising:
an input polarizing optical element configured to separate two orthogonally polarized components of collimated laser radiation and forward at least one of the two orthogonally polarized components along the initial propagation direction to the first outer region of the planar surface of the front side of the Faraday optic as the forward-going laser radiation; and
an output polarizing optical element arranged to intercept the forward-going laser radiation when propagating away from the second outer region of the planar surface of the front side of the Faraday optic after the even number of passes;
a reciprocal polarization altering optical element arranged to intercept the forward-going laser radiation between the input and output polarizing optical elements; and
a light redirecting element arranged to remotely dissipate isolated reverse-going laser radiation.

16. The optical isolator of claim 15, further comprising a magnetic structure for generating a magnetic field within the Faraday optic, the magnetic structure surrounding but being separated from the Faraday optic, the Faraday optic and the magnetic structure being configured to rotate polarization of forward-going laser radiation by a total of 45 degrees in a first rotation direction, the reciprocal polarization altering optical element being configured to rotate polarization of the forward-going laser radiation by an additional 45 degrees in the first rotation direction.

17. The optical isolator of claim 15, wherein:
the input polarizing optical element is a first birefringent displacer configured to forward both of the two orthogonally polarized components as the forward-going laser radiation; and the output polarizing optical element is a second birefringent displacer configured to combine the two orthogonally polarized components into a single output beam.

18. The optical isolator of claim 17, wherein the light redirecting element is a rejection mirror disposed in an input propagation path of the collimated laser radiation toward the first birefringent displacer, the rejection mirror being arranged to deflect reverse-going laser radiation displaced from the input propagation path.

19. The optical isolator of claim 17, further comprising a rejection mirror disposed in an output propagation path of the single output beam, the rejection mirror being arranged to deflect forward-going laser radiation not combined by the second birefringent displacer.

20. The optical isolator of claim 15, wherein:
the input polarizing optical element is a first polarizing beam splitter cube configured to transmit only a selected one of the two orthogonally polarized components to the Faraday optic; and
the output polarizing optical element is a second polarizing beam splitter cube.

* * * * *